(12) United States Patent
Gu

(10) Patent No.: US 9,342,151 B2
(45) Date of Patent: May 17, 2016

(54) HAND MOTION-CAPTURING DEVICE WITH FORCE FEEDBACK SYSTEM

(71) Applicant: Xiaochi Gu, Nanjing (CN)

(72) Inventor: Xiaochi Gu, Nanjing (CN)

( * ) Notice: Subject to any disclaimer, the term of this patent is extended or adjusted under 35 U.S.C. 154(b) by 0 days.

(21) Appl. No.: 14/459,594

(22) Filed: Aug. 14, 2014

(65) Prior Publication Data

US 2016/0018892 A1    Jan. 21, 2016

(30) Foreign Application Priority Data

Jul. 21, 2014  (CN) .......................... 2014-1-0346346

(51) Int. Cl.
*G06F 3/01*    (2006.01)

(52) U.S. Cl.
CPC ................ *G06F 3/016* (2013.01); *G06F 3/014* (2013.01); *G06F 3/017* (2013.01)

(58) Field of Classification Search
CPC ......... G06F 3/014; G06F 3/016; G06F 3/017; A61B 5/6806
USPC ........................................................ 345/156
See application file for complete search history.

(56) References Cited

U.S. PATENT DOCUMENTS

| | | | |
|---|---|---|---|
| 5,354,162 A * | 10/1994 | Burdea ................. | A61F 5/0118 414/4 |
| 5,912,658 A | 6/1999 | Bergamasco | |
| 7,138,976 B1 | 11/2006 | Bouzit | |
| 7,862,522 B1 | 1/2011 | Barclay | |
| 9,104,271 B1 * | 8/2015 | Adams .................. | G06F 3/0426 |
| 2010/0134327 A1 * | 6/2010 | Dinh ....................... | G06F 3/014 341/20 |
| 2010/0234182 A1 * | 9/2010 | Hoffman .............. | A61B 5/1125 482/8 |
| 2011/0234483 A1 * | 9/2011 | Lan ......................... | A63F 13/06 345/156 |
| 2012/0025945 A1 | 2/2012 | Yazadi | |
| 2013/0278500 A1 | 10/2013 | Kawasaki | |

FOREIGN PATENT DOCUMENTS

EP        2345951        7/2011
WO     2012081402     6/2012

OTHER PUBLICATIONS

Control Vr: downloaded on Dec. 18, 2014 from http://www.controlvr.com; prior art as of at least Aug. 13, 2014.
Leap Motion: downloaded on Dec. 18, 2014 from https://www.leapmotion.com/product, prior art as of at least Aug. 13, 2014.
(Continued)

*Primary Examiner* — Viet Pham

(57) ABSTRACT

This disclosure includes a hand motion-capturing device with a force feedback system. In some embodiments the device includes a base, a microcontroller connected to the base, a thumb sensor module and four-finger sensor modules each electrically connected to the microcontroller. In some embodiments, the device may include five-link rods that interconnect the thumb sensor module to the base and each of the four-finger sensor modules to the base. In some embodiments, the device includes a thumb force feedback system adapted and configured to receive a human thumb and a four-finger force feedback system adapted and configured to receive an index finger, a middle finger, a ring finger, and a little finger. The thumb force feedback system and the four-finger force feedback system may each be movably connected to respective link rods and the thumb sensor module and four-finger sensor modules, respectively.

20 Claims, 9 Drawing Sheets

(56) References Cited

OTHER PUBLICATIONS

Cyberglove II data sheet: downloaded on Dec. 18, 2014 from http://www.cyberglovesystems.com/products/cyberglove-II/overview, prior art as of at least Aug. 13, 2014.
Cyberglove III data sheet: downloaded on Dec. 18, 2014 from http://www.cyberglovesystems.com/products/cyberglove-III/overview, prior art as of at least Aug. 13, 2014.

Website: Control VR—www.controlvr.com.
Website: Leap Motion—www.leapmotion.com/product.
Website: Cyberglove II—http://www.cyberglovesystems.com/products/cyberglove-II/overview.
Website: Cyberglove III—http://www.cyberglovesystems.com/products/cyberglove-III/overview.

* cited by examiner

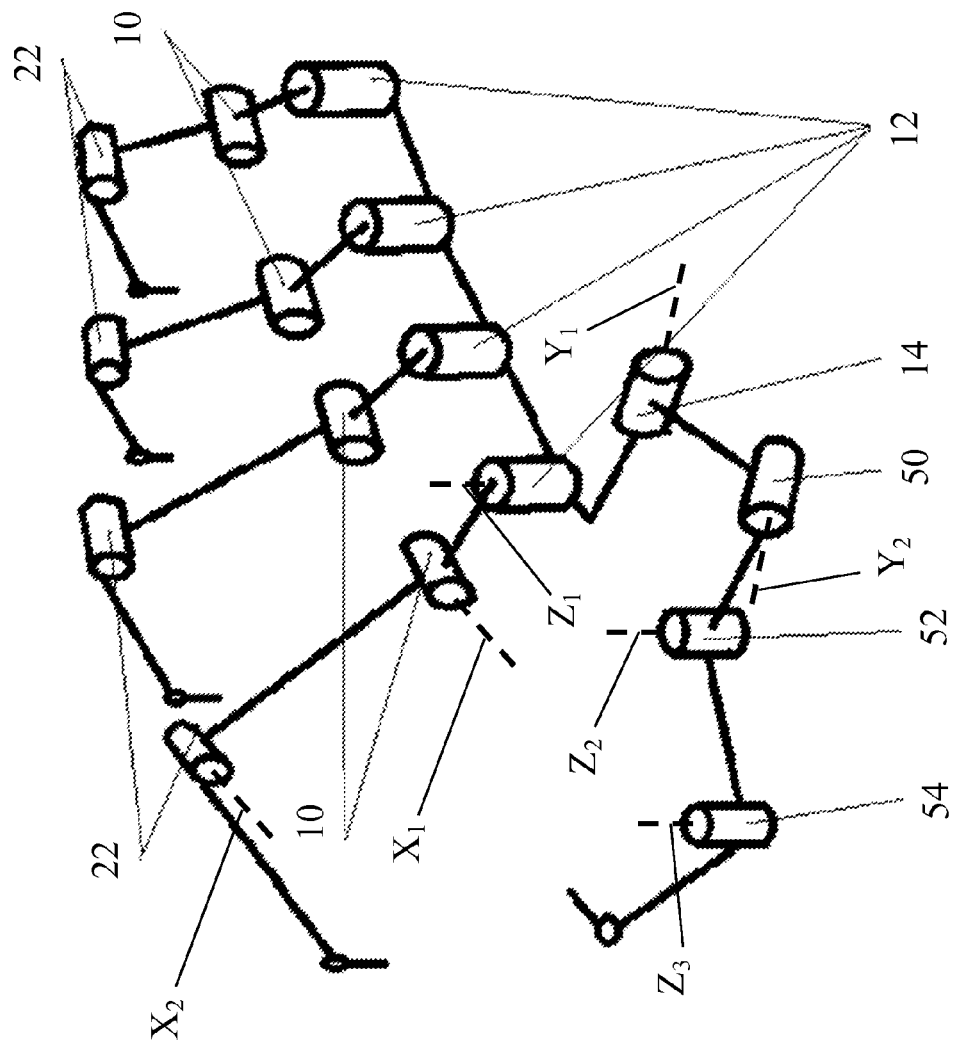
Figure 2
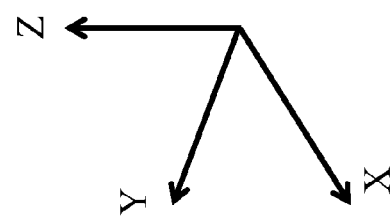

HAND MOTION-CAPTURING DEVICE WITH FORCE FEEDBACK SYSTEM

CROSS-REFERENCE TO RELATED APPLICATIONS

This application claims the benefit of Chinese Patent Application Serial No. 201410346346.7; filed Jul. 21, 2014; and entitled A HAND MOTION-CAPTURING DEVICE WITH A FORCE FEEDBACK SYSTEM USING A MECHANICAL APPROACH; the entire contents of which are incorporated herein by reference.

BACKGROUND

1. Field

Various embodiments disclosed herein relate to a motion-capturing input device, with applications in virtual reality and robot control. Certain embodiments relate to a hand-motion capturing device using a mechanical approach and capable of offering force feedback.

2. Description of Related Art

There are currently a number of hand-motion capturing solutions. Some existing solutions use camera and computer vision technologies to analyze the shape and direction of a hand. Three hand-motion-capturing approaches use optical capturing, IMU (inertia measurement unit) capturing and bending sensor capturing.

Among devices that use the optical capturing approach, a device called the "Leap Motion Controller" (from Leap Motion, Inc.) uses an infrared camera to track motion of hands and utilizes algorithms to fuse data from the camera. However, some disadvantages are commonly seen in devices that use computer vision to track the motion of the hand. The ability of these devices to track hand motion is restricted due to the camera's limited monitoring scope and direction. These devices are not capable of generating a correct hand model when a user's hand is out of the camera's monitoring scope. Furthermore, an optical-capturing-based solution is unable to offer force feedback without incorporating an additional wearable device.

Another device called the "ControlVR" (from ControlVR) uses IMU to measure the offset angle of each finger. A disadvantage of the IMU device is the need to recalibrate the zero-offset each time the device is powered on. Additionally, because this approach involves installing drivers on the back of the user's hand, implementing force feedback is more difficult. Moreover, this approach uses bending sensors (such as a strain gauge) installed on a glove to capture hand motion. However, this approach is not able to accurately provide measurements because of the non-linear relationship between sensor readings and bending of finger. As well, it is difficult to implement force-feedback with this approach due to similar reasons as with the IMU approach. Bending sensors based approach, similar to the IMU approach, is unable to offer exact coordinates to describe finger positions due to their principles of measurements.

Furthermore, a company called CyberGlove Systems LLC offers a product called "CyberGlove", which is a bending-sensor-based hand-motion-capturing glove with force-feedback function. The force feedback unit of the glove system is implemented using a set of steel wires and block-and-tackle systems. An external controller box is also needed for the force-feedback unit. The whole hand-motion-capturing and force-feedback system is large in volume and heavy in weight. As such, it is not portable and able to be worn easily on the hand.

SUMMARY

Several embodiments can include a hand motion-capturing device with a force feedback system. The device includes a base, a microcontroller connected to the base, and a thumb sensor module and four-finger sensor modules each electrically connected to the microcontroller. The device also includes five link rods. Each of the five link rods interconnects the thumb sensor module to the base and each of the four-finger sensor modules to the base. The device also includes a thumb force feedback system adapted and configured to receive a human thumb. The thumb force feedback system is movably connected to the link rod and the thumb sensor module. As well, the device includes a four-finger force feedback system adapted and configured to receive an index finger, a middle finger, a ring finger, and a little finger, wherein the four-finger force feedback system is movably connected to the link rod and the four-finger sensor modules.

BRIEF DESCRIPTION OF THE DRAWINGS

These and other features, aspects, and advantages are described below with reference to the drawings, which are intended to illustrate, but not to limit, the invention. In the drawings, like reference characters denote corresponding features consistently throughout similar embodiments.

FIG. 2 illustrates a perspective view of a schematic of a device, according to some embodiments.

DETAILED DESCRIPTION

Figure 1:
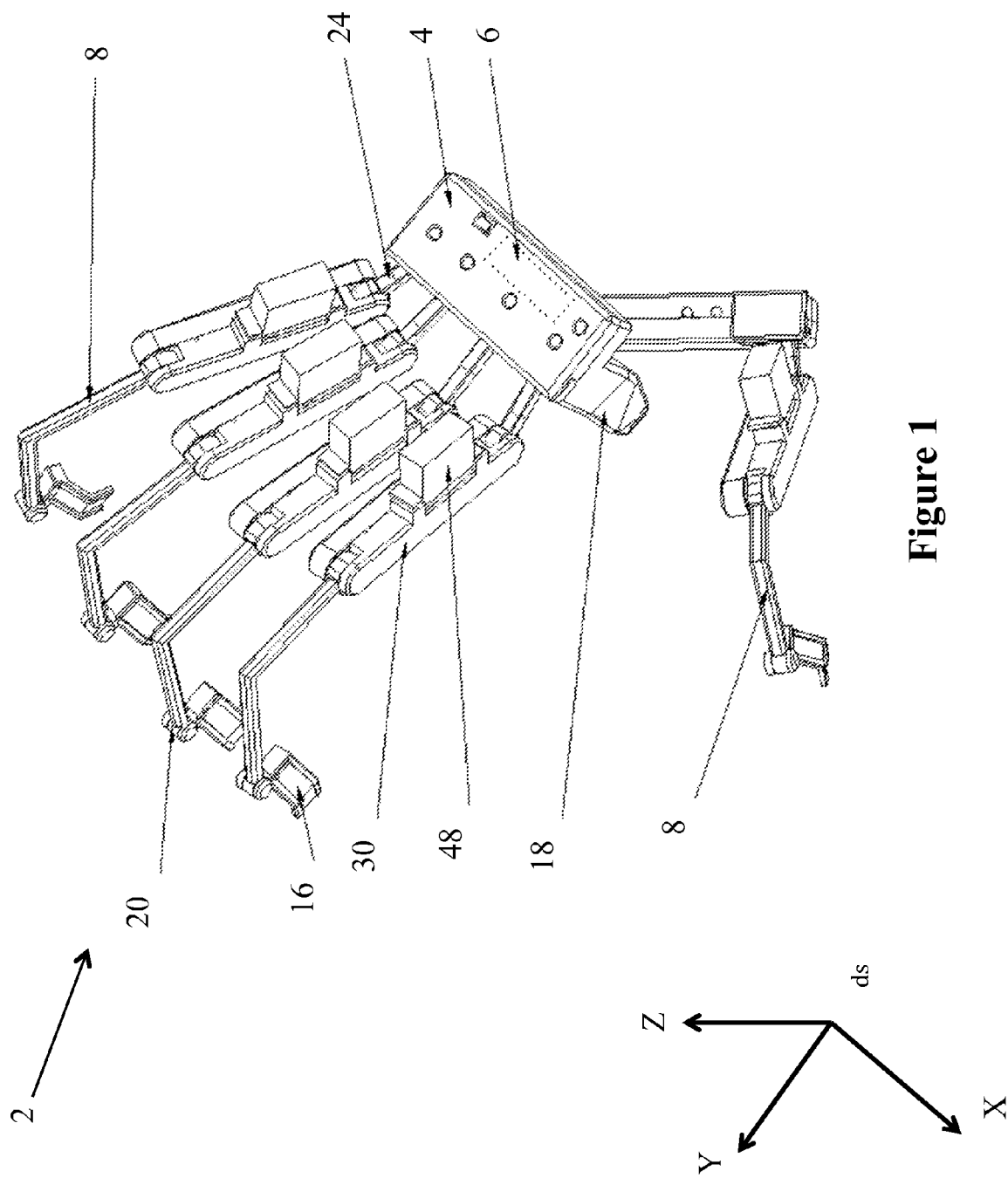
FIG. 1 illustrates a perspective view of a device, according to some embodiments.

Although certain embodiments and examples are disclosed below, inventive subject matter extends beyond the specifically disclosed embodiments to other alternative embodiments and/or uses, and to modifications and equivalents thereof. Thus, the scope of the claims appended hereto is not limited by any of the particular embodiments described below. For example, in any method or process disclosed herein, the acts or operations of the method or process may be performed in any suitable sequence and are not necessarily limited to any particular disclosed sequence. Various operations may be described as multiple discrete operations in turn, in a manner that may be helpful in understanding certain embodiments; however, the order of description should not be construed to imply that these operations are order dependent. Additionally, the structures, systems, and/or devices described herein may be embodied as integrated components or as separate components.

For purposes of comparing various embodiments, certain aspects and advantages of these embodiments are described. Not necessarily all such aspects or advantages are achieved by any particular embodiment. Thus, for example, various embodiments may be carried out in a manner that achieves or optimizes one advantage or group of advantages as taught herein without necessarily achieving other aspects or advantages as may also be taught or suggested herein.

This disclosure may resolve some of the disadvantages of the currently available motion-capturing solutions. Particularly, this disclosure may offer more robust measurement readings of the user's hand-motion and gestures. These measurement readings may be used in robotic control, mechanical control, music control, gaming, etc. Besides, this disclosure may offer a portable force-feedback system. The 16 degrees of freedom of movement device, as disclosed below, may be able to precisely track and generate a hand model. It is also possible to describe the relative position between each fingertip and back of the hand using a coordinate system. As well, a force feedback unit may provide resistance, which may effectively simulate the user feeling the object not existing in his or her presence. This may create a better sense of presence.

In some examples, a user may use this device to control a robot to perform a bomb disposal task from one kilometer distance from the bomb's location. The user can remotely control a robot hand to grasp explosives by moving the hand of the user. At the instant that the object is grasped in position, self-locking mechanisms may be signaled to lock the rotation joint in a fixed position in order to generate a feel of grasping. Previously, this operation may have required multiple cameras to locate the object. However, with this invention, a user may only use one camera and the sense of touch to locate the object. With the use of head-mounted display (such as Oculus Rift), users may be more effective in bomb disposal.

In some examples, such as gaming, users may use a head-mounted display to see both of their hands in a virtual world. When the user tries to grasp a virtual object in virtual reality, software embodiments of this disclosure will analyze the coincidence of a hand model and an object model and signal the self-locking mechanism on the device to lock the rotation joint in a fixed position. The locking effect may produce pressure on the fingertips of the user. The pressure, in turn, creates a sense of touching that may simulate the sense of grasping an object in the real world. The sense may offer life-like experience for games and may add to the extension of games.

In order to solve the technological problems described above, embodiments described in this disclosure may utilize a hand-motion-capturing device using a mechanical approach and capable of offering force feedback. The device may track the motion of a hand using wearable hand-motion-capturing structures adapting to a human hand or a hand of any mammal. By utilizing multiple types of sensors and structures integrated with connecting rods, the device may be able to track hand motion using a physical approach and convert the movement of a hand into rotational signals which can later be used in the generation of a precise hand model.

When the hand moves, the device attached to the finger will accordingly produce a displacement. The user's hand may perform movement without difficulty because the connecting rods not only adapt with a human hand but also are movably connected with the sensors. These sensors may be perpendicular in the X, Y and Z direction. Displacement data can be recorded from the sensors in order to track the precise movement of the hand. With the data from the measurements, a robust hand model can be generated using a mathematical method. The hand model can be used immediately or later to control other devices.

Currently available methods include the use of a high-speed camera, strain gauge or other components of high cost. However, measurement readings from these methods are often less than satisfying. The embodiments described herein may comprise a microcontroller and several low-cost sensors. Because this hand-motion-capturing device physically connects with user's hand, the hand motion can be recorded in real-time with little omission. Thus, it is a low-cost approach but offers robust measurement readings. In addition, the force feedback system may include a thumb force feedback system and a four-finger force feedback system. The force feedback system may obstruct the rotation of the rotational joint with resistance by transmitting a profiled gear via an executional element (such as a servo motor, etc.) to push the rack to slide to two sides. In some embodiments, the system may obstruct the rotation by plugging the spike of the rack into the ratchet wheel of the rotational joint. In yet some embodiments, the system may press the surface of the rotational joint with a friction brick 44, which may generate a sense of gripping for the user.

This invention may provide convenience for industrial designers in CAD drawing. For example, specific preset gestures can be used as shortcuts. Electrical, mechanical and robotic engineers may also use this invention to control other devices. The movement of the finger can be used to control a robot arm, a robot hand or any other devices. For users in the field of art and music, this invention can be used to perform an innovative art form. For example, musicians and artists can adjust music pitch or light colors by using this device. Meanwhile, users without any professional background can use this device as an alternative of mouse to move a cursor or to control presentation slides.

With specific reference to FIG. 1, some embodiments of the device 2 may include a base 4, a microcontroller 6 connected to the base 4, a thumb sensor module and four-finger sensor modules each electrically connected to the microcontroller 6. The base 4 may be attached to the back of the hand via a connection element. As well, the microcontroller 6 may be attached to the base 4 and electrically connected to the exoskeleton of the five fingers (the thumb sensor module and the four-finger sensor module). Data may be collected by the microcontroller 6 and transmitted via wires in the finger exoskeletons to the base 4. In this manner, the hand joint can twist without restriction, and thus hand movements may achieve increased flexibility and precision.

The device 2 may also include five link rods 18, whereby each of the five link rods 18 interconnects the thumb sensor module to the base 4 and each of the four-finger sensor modules to the base 4. In some embodiments, the device 2 may include a thumb force feedback system adapted and configured to receive a human thumb. The thumb force feedback system may be movably connected to the link rod 18 and the thumb sensor module. As well, in some embodiments, the device 2 may include a four-finger force feedback system adapted and configured to receive an index finger, a middle finger, a ring finger, and a little finger. The four-finger force feedback system may be movably connected to the link rod 18 and the four-finger sensor modules. It should be appreciated that the fingers may be human fingers, or fingers belonging to any mammal, such as a gorilla.

Figure 3:
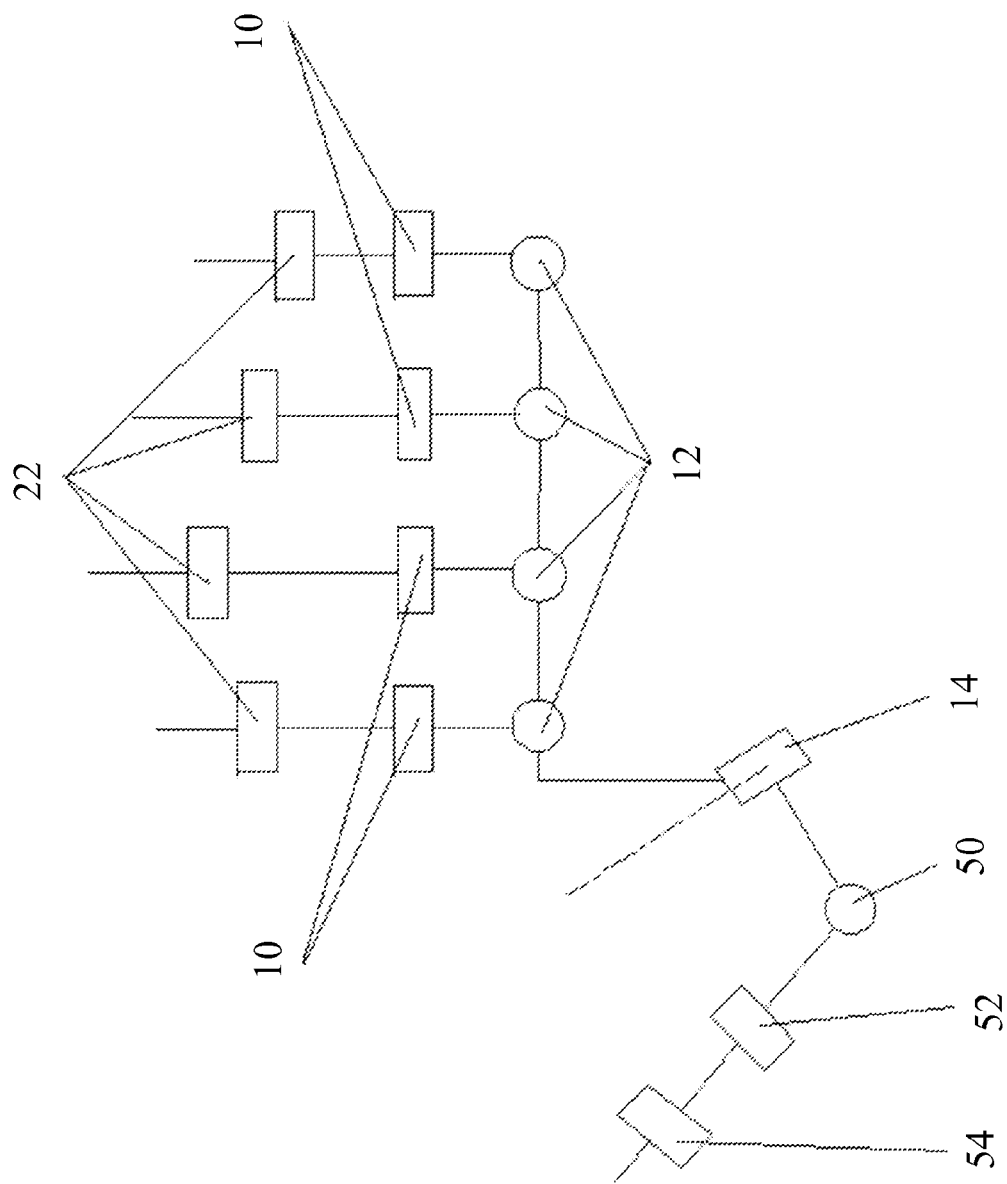
FIG. 3 illustrates a top view of a schematic of a device, according to some embodiments.

As shown in FIGS. 2 and 3, the base 4 may include a bottom plane that extends along a first direction X and a second direction Y that is perpendicular to the first direction X. The four-finger sensor modules may each include four pairs of perpendicularly connected first and second potentiometers 10 and 12. The four second potentiometers 12 may be disposed on the base 4 with the axes $Z_1$ being parallel to a third direction Z that is perpendicular to the first and second directions X and Y, such that they are perpendicular to the bottom plane of the base 4. The system may also include four third potentiometers 22. Each of the third potentiometers 22 may be connected to a first potentiometer 10 through the four-finger force feedback system, and parallel with the first potentiometer's axis $X_1$, which may also parallel with the third direction Z. It should be appreciated that any number of first, second, and/or third potentiometers 22 above or below four, may be used in the system.

With continued reference to FIGS. 2 and 3, the thumb force sensor module may include sequentially connected fourth potentiometer 14, fifth potentiometer 50, and sixth potentiometer 52. The fourth potentiometer's axis $Y_1$ may be parallel to the fifth potentiometer's axis $Y_2$. The sixth potentiometer's axis $Z_2$ may be perpendicular to each of the fourth potentiometer's axis $Y_1$ and the fifth potentiometer's axis $Y_2$. As well, there exists a seventh potentiometer 54 connected with the sixth potentiometer 52 through the thumb force feedback system. Additionally, the seventh potentiometer's axis $Z_3$ may be parallel to the sixth potentiometer's axis $Z_2$. The fourth potentiometer 14 may be connected to the second potentiometer. As well, the fourth potentiometer 14 may be attached to the back side of the base 4. In addition, the fourth potentiometer's axis $X_2$ may intersect with the perpendicular plane in which the four second potentiometer's axes $Z_1$ are located. As well, the fourth potentiometer 14 may be connected with microcontroller 6.

Figure 4:
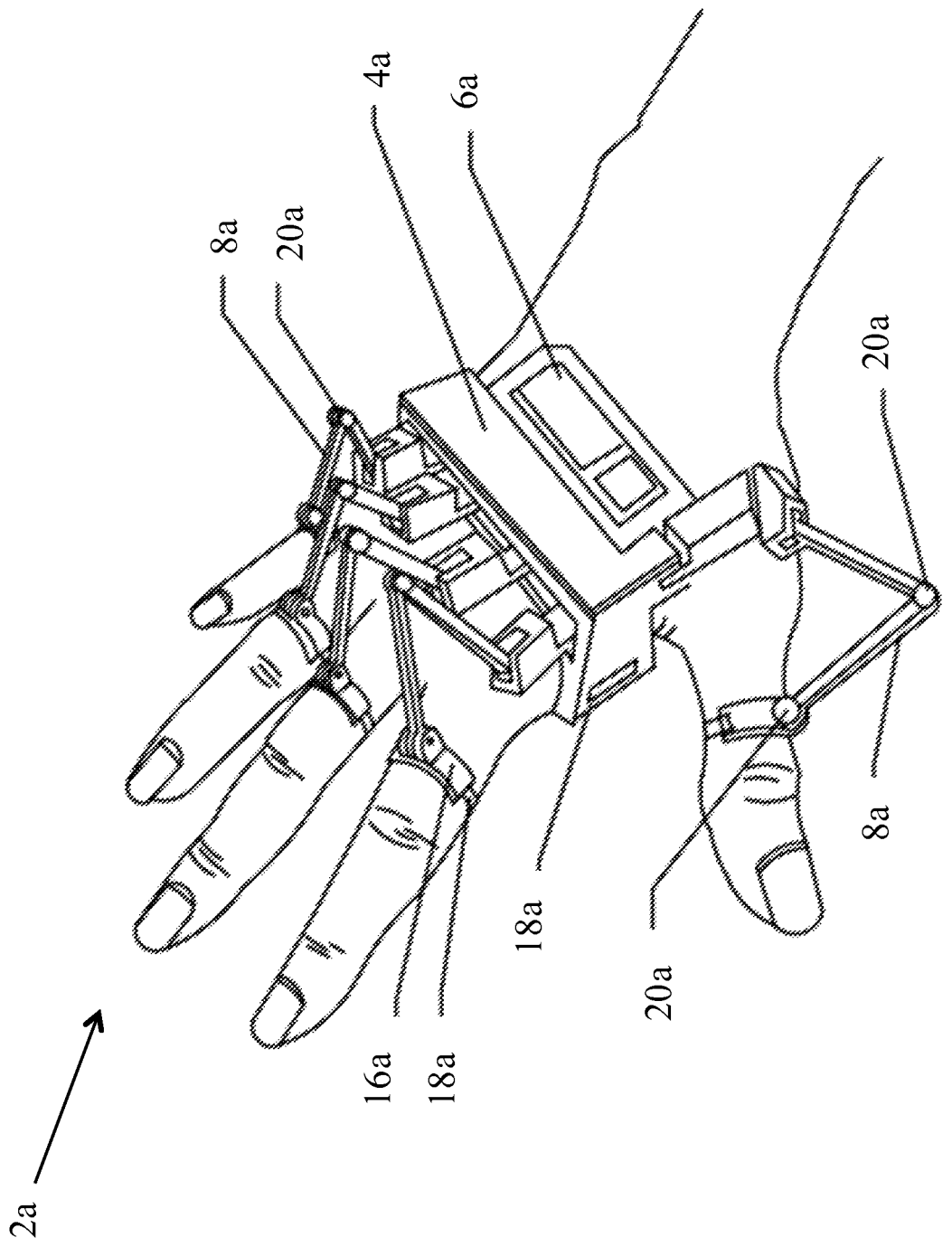
FIG. 4 illustrates a perspective view of another device, according to some embodiments.
Figure 5:
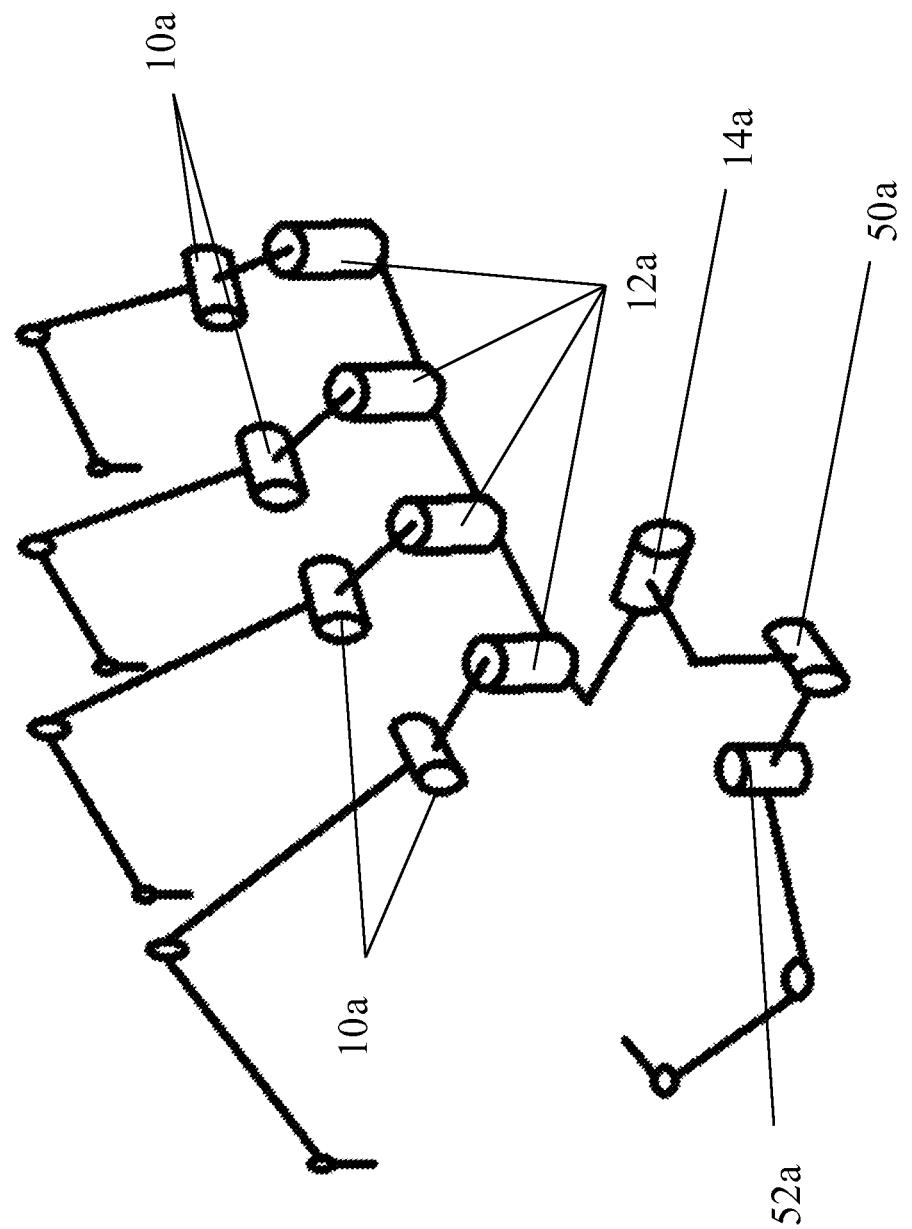
FIG. 5 illustrates a perspective view of a schematic of the device from FIG. 4, according to some embodiments.

FIGS. 4 and 5 illustrate another hand motion capturing device 2a with a force feedback system. The device 2a illustrated in FIGS. 4 and 5 is similar to the device 2 disclosed in FIGS. 1-3; however, the device 2a disclosed in FIGS. 4 and 5 includes 11 potentiometers as opposed to the 16 potentiometers disclosed in device 2 of FIGS. 1-3. Accordingly, the device 2a shown in FIGS. 4 and 5 includes 11 degrees of freedom of movement, as opposed to the device 2 with 16 degrees of freedom of movement from FIGS. 1-3. In this manner, the device 2a of FIGS. 4 and 5 includes four-first potentiometers 10a, four-second potentiometers 12a, a fourth potentiometer 14a, a fifth potentiometer 50a, and a sixth potentiometer 52a.

Furthermore, the device 2a of FIGS. 4 and 5 is structurally similar to the device 2 of FIGS. 1-3, except that device 2a does not include four-third potentiometers 22 and a seventh potentiometer 54. In place of the third and seventh potentiometers 22 and 54, the device includes a hinged joint defined by connection bolts 20a that couple the adjacent profiled linked rods 8a together. Generally, it should be appreciated that the devices disclosed in FIGS. 1-5 are just two examples of the many different variations of devices that can include any number of potentiometers to thereby define any number of degrees of freedom of movement.

Figure 6:
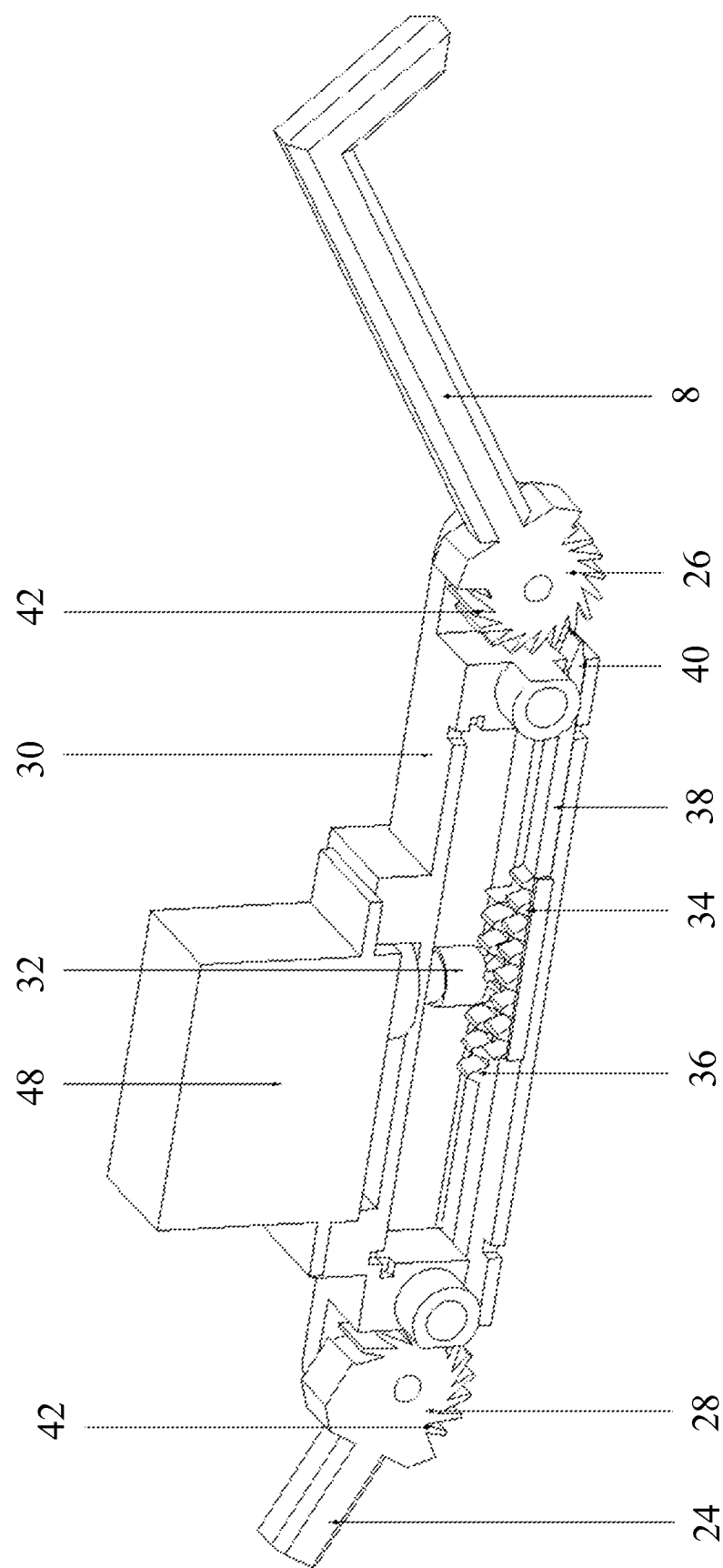
FIG. 6 illustrates a cross-sectional perspective view of a locking mechanism, according to some embodiments.
Figure 7:
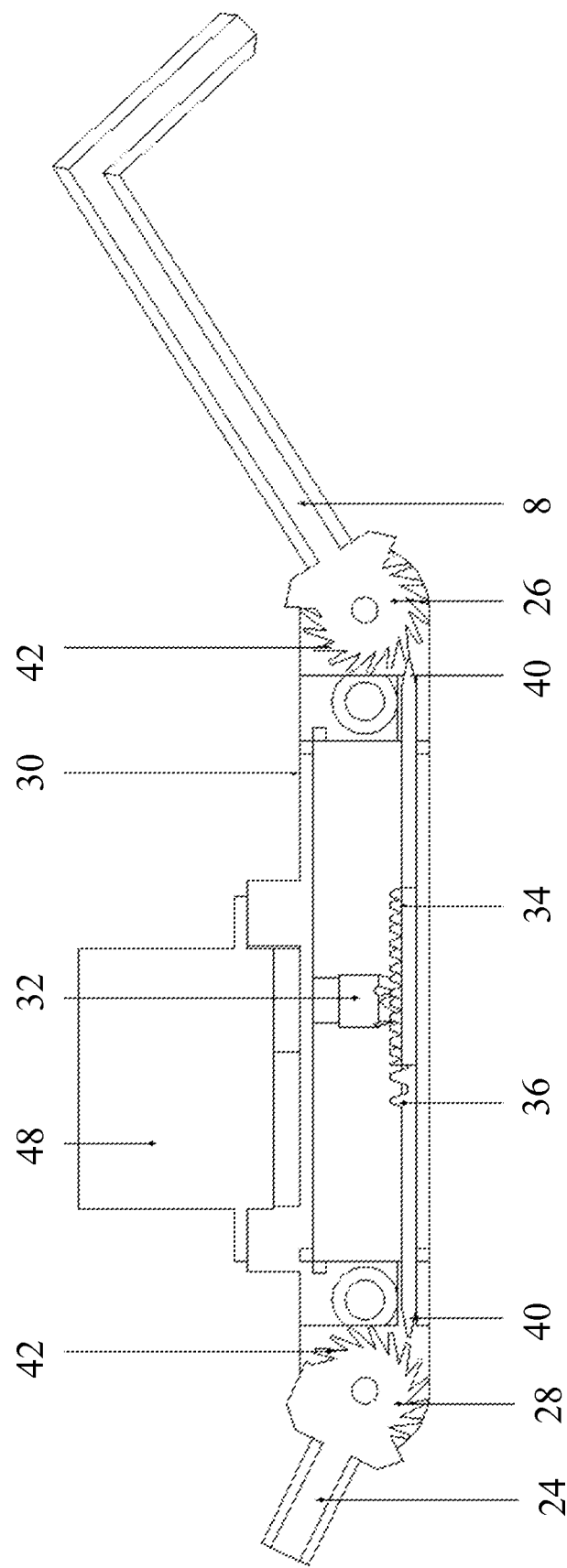
FIG. 7 illustrates a cross-sectional side view of the locking mechanism as shown in FIG. 6, according to some embodiments.
Figure 8:
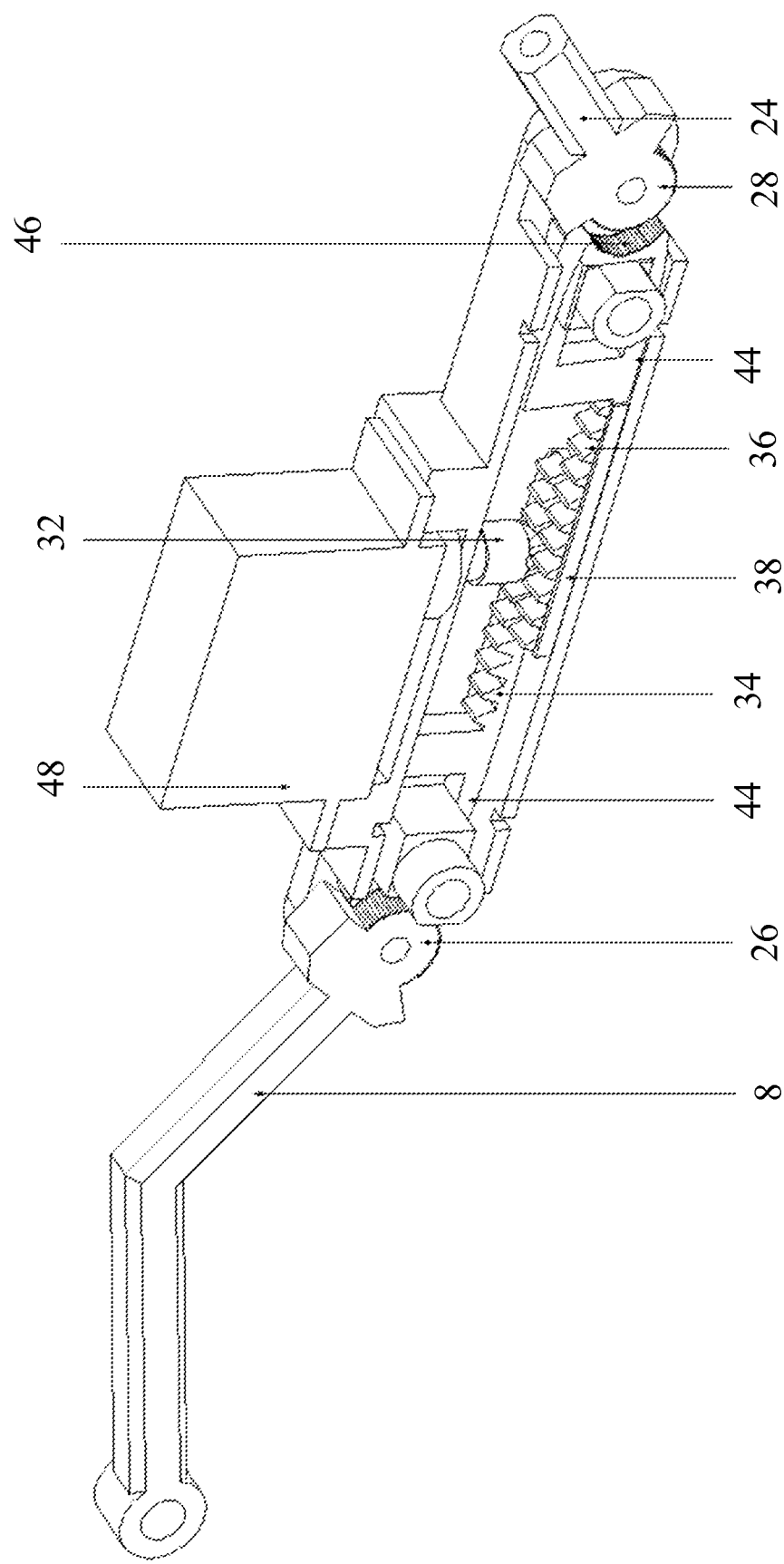
FIG. 8 illustrates a cross-sectional perspective view of another locking mechanism, according to some embodiments.
Figure 9:
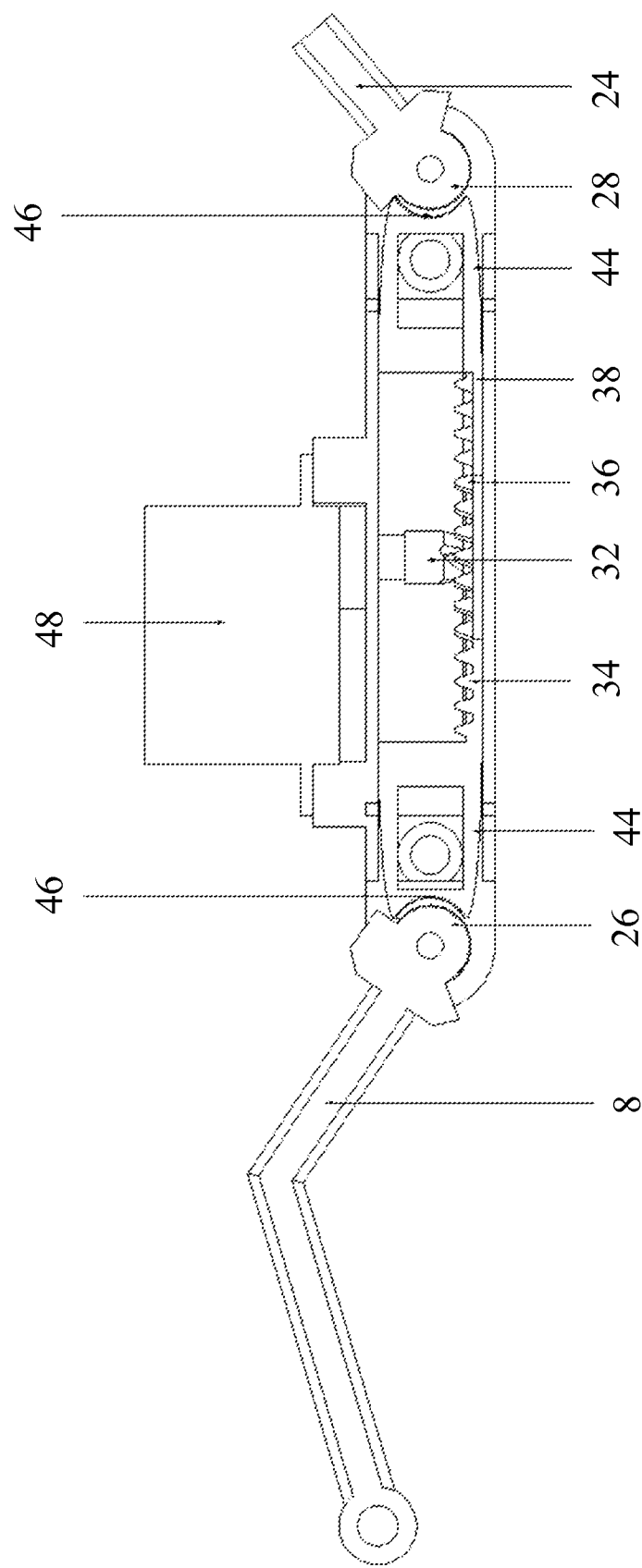
FIG. 9 illustrates a cross-sectional side view of the locking mechanism as shown in FIG. 8, according to some embodiments.

As shown in FIGS. 6 and 7, the link rods 18 may include five pairs of profiled link rods 8 and five straight rods 24. The four pairs of profiled link rods 8 and four straight rods 24 may be connected with the four-finger sensor module. The remaining pair that includes a profiled link rod 8 and one straight rod 24 may be connected with the thumb sensor module. Each pair of the profiled link rods 8 may be movably connected. As well, each pair may have a finger cap 16 on one side, and a first rotational joint 26 on the other side. One of the first rotational joints 26 may be coaxially connected with the seventh potentiometer 54. Furthermore, each of the other four first rotational joints 26 may be in coaxial connection with a third potentiometer 22.

Each straight rod 24 may have a second rotational joint 28 on one side. One of the second rotational joints 28 may be coaxially connected with the sixth potentiometer 52. The other four second rotational joints 28 may be coaxially connected with the first potentiometers 10. Furthermore, each of the straight rods 24 connected with the sixth potentiometers 52 may be connected with one of the fifth potentiometers 50 on the other end. The straight rod 24 connected with the first potentiometers 10 may also be connected with the second potentiometer on the other end.

The four-finger force feedback system and the thumb force feedback system may have the same structure. As such, each may include a case 30, a transmission mechanism and a locking mechanism. The transmission mechanism and the locking mechanisms may be disposed inside the case 30. The case 30 of each of the four-finger force feedback systems may have one of the third potentiometer 22 and one of the first potentiometer 10 on its two ends. The case 30 of the thumb force feedback system may have the seventh potentiometer 54 and the sixth potentiometer 52 on its two ends.

Each of the first rotational joints 26 of the profiled link rods 8 that are connected with the four-finger force feedback system may be in a coaxial connection with a respective third potentiometer 22. The first rotational joint 26 can be in a position-lock with the locking system. As well, each of the second rotational joints 28 of the straight rods 24 connected with the four-finger force feedback system may be in coaxial connection with the first potentiometer 10. The second rotational joint 28 may position-lock with the locking system. In some embodiments, the locking mechanism is a ratchet wheel self-lock mechanism. In some embodiments, the locking mechanism is a resistance wheel self-lock mechanism.

The first rotational joint 26 of the profiled link rod 8 connected with the thumb force feedback system may be coaxially connected with the seventh potentiometer 54. The first rotational joint 26 can position-lock via the locking system. The second rotational joint 28 of the straight rod 24 connected with the thumb force feedback system may be coaxially connected with the sixth potentiometer 52. The second rotational rod may position-lock via the locking system.

It should be appreciated that the potentiometers described in this disclosure can be any type of potentiometer. For example, the potentiometers can be rotational potentiometers. As illustrated in a simplified kinetic model, the structure of the thumb sensor module and four-finger sensor modules is shown in FIGS. 2 and 3, where each cylinder represents a rotational potentiometer. As shown in FIGS. 2 and 3, the 16 rotational potentiometers in the hand motion capture system can transform a rotational signal to an electrical signal. However, this is just one of many examples. It should be appreciated that other hand motion capture systems can have any number of rotational potentiometers greater than or less than 16 rotational potentiometers, for example 11, 21, or 26 potentiometers. Data can be collected from the rotational potentiometers by the microcontroller 6.

Because the thumb can have a different exoskeleton structure than the four-fingers (index, middle, ring and little), accordingly the thumb sensor module may consist of 4 potentiometers. Among them the fourth potentiometer 14, the fifth potentiometer 50 and the sixth potentiometer 52 can be perpendicular to each other, together forming the X, Y, and Z axes of a rectangular coordinate. It should be appreciated that the X, Y, and Z axes can be parallel to the first direction X, second direction Y, and third direction Z, respectively. Accordingly, the seventh potentiometer 54 and the sixth potentiometer 52 can be parallel and connected via the thumb force feedback system. The fourth potentiometer 14 can be attached to the back side of the base 4, and electrically connected to the microcontroller 6. The four-finger sensor modules may capture the motion of the other four fingers. The four-finger sensor modules and the thumb sensor module may be connected by the fourth potentiometer 14. Accordingly, all potentiometers may be connected to the microcontroller 6.

In the four-finger sensor module, the second potentiometer may be perpendicular to the first potentiometer 10. Accordingly, the first potentiometer 10 and the third potentiometer 22 may be parallel to each other and connected via the four-finger force feedback system. The four second potentiometers 12 may be attached to the base 4, and all aligned in the same direction. The four second potentiometers 12 may also be aligned in the same vertical plane perpendicular to the plane of the base 4, for example, the third direction Z. As well, the fourth potentiometer 14 may be attached to the backside of the base 4. Accordingly, the fourth potentiometers 14 can be lower than the other four second potentiometers 12, whereby its axis $Y_1$ intersects with the connection of the axes $Z_1$ of the four second potentiometers 12. Furthermore, the fourth potentiometer 14 may have an angle range from 0 to 30 degrees, which means the thumb base 4 has an angle range from 0 to 60 degrees relative to the four fingers, as illustrated in FIG. 3. The 0 to 60 degree deflection angle at the thumb base 4 joint may be ergonomically correct, which may allow the exoskeleton to match more closely with the thumb motions. This may allow the thumb to move more fluently to capture motions. As well, it may reduce any discomfort in wearing the device 2. The 0 to 60 degrees may not mean that the device 2 can rotate in this range, but that a certain angle may be selected from this range and fixed.

As shown in FIGS. 6 and 7, the transmission system may also include a profiled gear 32, as well as a first rack 34 and a second rack 36. The first rack 34 can be parallel with the second rack 36. Each of the first and second racks 34 and 36 may be movably connected with one of two slide tracks 38 disposed inside the case 30. The profiled gear 32 may be connected to the case 30, above the first rack 34. In this configuration, the profiled gear 32 may mesh with the first rack 34 and the second rack 36. The first rack 34 and the second rack 36 may slide in the slide track 38 under the drive of the profiled gear 32.

In addition, FIGS. 6 and 7 demonstrate one way that locking may be achieved. As illustrated, the locking mechanism may be a ratchet wheel self-locking mechanism. A spark 40 may be included on one end of the first rack 34 such that it is near the first rotational joint 26, and on the end of the second rack 36 that is close to the second rotational joint 28. A plurality of ratchets 42 may surround the outer surfaces of the first rotational joint 26 and the second rotational joint 28. Accordingly, the ratchets 42 may mesh with the spark 40.

FIGS. 6 and 7 demonstrate yet another way that locking may be achieved. As shown, the locking system may include a resistance wheel. In this manner, a resistance or friction brick 44 may be connected with an end of the second rack 36 that is close to the second rotational joint 28, and an end of the first rack 34 that is close to the first rotational joint 26. In some embodiments, each friction brick 44 has a U-shape slot 46, which has an opening pointing towards the two sides of the case 30. The curved frictional concave of the U-shape slot 46 matches the first rotational joint 26 and the second rotational joint 28. As well, there may be matching threads on the curved frictional concave surface, as well as the first and second rotational joints 28. In addition to matching threads, other materials may be added to the concave surface to increase resistance. For example, these materials may be rubber, other types of polymers, or the like. In some examples, the materials may be aluminum and plastic.

The transmission system may have a drive system 48. The drive system 48 may be disposed outside the case 30 and connected with the profiled gear 32. The drive system 48 may also be connected with the microcontroller 6. In some embodiments, the drive system 48 is a servo motor, a gear motor linear actuator, or a screw motor. In some embodiments, the microcontroller 6 is a Bluetooth module. As well, in some embodiments, the connection pieces are disposed on an outer surface of the base 4. The connection pieces may be nylon straps, metal rings, plastic rings, or the like. As well, the finger caps 16 may form movable connections with the profiled link rods 8 by connection bolts 20. In practice, a host computer decides whether the hand touches virtual objects. If it touches, the host computer sends a signal to the microcontroller 6, which drives the motor to lock the joints and obstructs the hand to crawl and bend, thus generating a sense of gripping for the user.

Interpretation

For the purposes of this disclosure, the term "substantially" should be understood to mean for the most part or to a great or significant extent. As well, the terms "movable" or "movably" can also mean "unfixed" or "unfixedly," meaning that it is able to be moved and not fixed.

None of the steps or limitations described herein is essential or indispensable. Any of the steps or limitations can be adjusted or modified. Other or additional steps and/or limitations can be used. Any portion of any of the steps, processes, structures, and/or devices disclosed or illustrated in one embodiment, flowchart, or example in this specification can be combined or used with or instead of any other portion of any of the steps, processes, structures, and/or devices disclosed or illustrated in a different embodiment, flowchart, or example. The embodiments and examples provided herein are not intended to be discrete and separate from each other.

The section headings and subheadings provided herein are nonlimiting. The section headings and subheadings do not represent or limit the full scope of the embodiments described in the sections to which the headings and subheadings pertain. For example, a section titled "Topic 1" may include embodiments that do not pertain to Topic 1 and embodiments described in other sections may apply to and be combined with embodiments described within the "Topic 1" section.

Some of the devices, systems, embodiments, and processes use computers. Each of the routines, processes, methods, and algorithms described in the preceding sections may be embodied in, and fully or partially automated by, code modules executed by one or more computer, processor, or machine configured to execute computer instructions. The code modules may be stored on any type of non-transitory computer-readable storage medium or tangible computer storage device, such as a hard drive solid state memory, flash memory, optical disc, and/or the like. The processes and algorithms may be implemented partially or wholly in application-specific circuitry. The results of the disclosed processes and process steps may be stored, persistently or otherwise, in any type of non-transitory computer storage such as, e.g., volatile or non-volatile storage.

The various features and processes described above may be used independently of one another, or may be combined in various ways. All possible combinations and subcombinations are intended to fall within the scope of this disclosure. In addition, certain method, event, state, or process blocks may be omitted in some implementations. The methods, steps, and processes described herein are also not limited to any particular sequence, and the blocks, steps, or states relating thereto can be performed in other sequences that are appropriate. For example, described tasks or events may be performed in an order other than the order specifically disclosed. Multiple steps may be combined in a single block or state. The example tasks or events may be performed in serial, in parallel, or in some other manner. Tasks or events may be added to or removed from the disclosed example embodiments. The example systems and components described herein may be configured differently than described. For example, elements may be added to, removed from, or rearranged compared to the disclosed example embodiments.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations and so forth. Also, the term "or" is used in its inclusive sense (and not in its exclusive sense) so that when used, for example, to connect a list of elements, the term "or" means one, some, or all of the elements in the list. Conjunctive language such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require at least one of X, at least one of Y, and at least one of Z to each be present.

The term "and/or" means that "and" applies to some embodiments and "or" applies to some embodiments. Thus, A, B, and/or C can be replaced with A, B, and C written in one sentence and A, B, or C written in another sentence. A, B, and/or C means that some embodiments can include A and B, some embodiments can include A and C, some embodiments can include B and C, some embodiments can only include A, some embodiments can include only B, some embodiments can include only C, and some embodiments can include A, B, and C. The term "and/or" is used to avoid unnecessary redundancy.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions, and changes in the form of the methods and systems described herein may be made without departing from the spirit of the inventions disclosed herein.

The following is claimed:

1. A hand motion capturing device with a force feedback system, including:
   a base;
   a microcontroller connected to the base;
   a thumb sensor module and four-finger sensor modules each electrically connected to the microcontroller, wherein each of the four-finger sensor modules includes a pair of perpendicularly electrically connected first and second potentiometers;
   five-link rods, whereby each of the five-link rods interconnects the thumb sensor module to the base and each of the four-finger sensor modules to the base;
   a thumb force feedback system adapted and configured to receive a human thumb, wherein the thumb force feedback system is movably connected to a link rod and the thumb sensor module; and
   a four-finger force feedback system adapted and configured to receive an index finger, a middle finger, a ring finger, and a little finger, wherein the four-finger force feedback system is movably connected to the link rod and the four-finger sensor modules,
   wherein the link rod includes five pairs of profiled link rods and five pairs of straight rods, wherein four pairs of the profiled link rods and four pairs of the straight rods are electrically connected with the four-finger sensor module, a fifth pair of profiled link rods and fifth pair of straight rods are electrically connected to the thumb sensor module, wherein each pair of the profiled link rods is a movable connection having a finger cap on one side, and a first rotational joint located on an opposite side, wherein the first rotational joint is coaxially electrically connected to a potentiometer, wherein the first rotational joint is one of five rotational joints, and wherein each of the other four rotational joints is coaxially electrically connected to a respective third potentiometer.

2. The device of claim 1, wherein the base includes a bottom plane that extends along a first direction and a second direction that is perpendicular to the first direction, wherein the axes of the first potentiometers extend along the first direction and the axes of the second potentiometers extend along a third direction that is perpendicular to the first and second directions, and wherein the four-finger sensor modules each include a pair of third potentiometers each being electrically connected to a respective first potentiometer, whereby the axes of the third potentiometers are parallel with the axes of the first potentiometers.

3. The device of claim 2, wherein the potentiometer is a seventh potentiometer, wherein the thumb force sensor module includes a sequentially electrically connected fourth potentiometer, fifth potentiometer, and sixth potentiometer, wherein the axes of the fourth and fifth potentiometers are parallel to each other and the axis of the sixth potentiometer is perpendicular to each of the axes of the fourth and fifth potentiometers, wherein the seventh potentiometer is electrically connected to the sixth potentiometer, an axis of the seventh potentiometer is parallel to the axis of the sixth potentiometer, wherein the fourth potentiometer is electrically connected to the second potentiometer on the back plane of the base, the axis of the fourth potentiometer intersecting a perpendicular plane which the four axes of each of the second potentiometers extends, and wherein the fourth potentiometer being electrically connected with the microcontroller.

4. The device of claim 3, wherein each straight rod has a second rotational joint on one side, whereby one of the second rotational joints is coaxially electrically connected to the sixth potentiometer, and the other four second rotational joints are coaxially electrically connected to respective first potentiometers, wherein the straight rod connected with the sixth potentiometer is electrically connected to the fifth potentiometer on an opposite end, and wherein each of the straight rods connected with the first potentiometers are further connected to a respective second potentiometer on an opposite end.

5. The device of claim 4, wherein the four-finger force feedback system and the thumb force feedback system define the same structure, and wherein the four-finger force feedback system and the thumb force feedback system each includes a body case that includes a transmission mechanism adapted and configured to actuate the profiled link rods and straight rods, and a locking mechanism adapted and configured to lock the profiled link rods and straight rods, wherein the transmission mechanism and the locking mechanisms are inside the body case, wherein the body case of each of the four-finger force feedback systems has one of the third potentiometers and one of the first potentiometers on each of its ends, and wherein the body case of the thumb force feedback system has the seventh potentiometer and a respective second potentiometer on each of its ends.

6. The device of claim 5, wherein each of the first and second rotational joints of the profiled link rods that are connected with the four-finger force feedback system is coaxially electrically connected with a respective third potentiometer, and wherein the first rotational joint is adapted and configured to position-lock with the locking system and each of the second rotational joints of the straight rods that are connected with the four-finger force feedback system is coaxially electrically connected to a respective first potentiometer such that the second rotational joint is adapted and configured to position-lock with the locking system.

7. The device of claim 6, wherein the locking mechanism is a ratchet wheel self-lock mechanism.

8. The device of claim 6, wherein the locking mechanism is a resistance wheel self-lock mechanism.

9. The device of claim 6, wherein the first rotational joint of the profiled link rod that is connected with the thumb force feedback system is coaxially electrically connected to the seventh potentiometer and the first rotational joint is adapted and configured to position-lock via the locking system, wherein the second rotational joint of the straight rod that is connected with the thumb force feedback system is coaxially electrically connected to the sixth potentiometer and the second rotational joint of the straight rod is adapted and configured to position-lock via the locking system, and wherein the locking mechanism is selected from the group consisting of a ratchet wheel self-lock mechanism and a resistance wheel self-lock mechanism.

10. The device of claim 9, wherein the transmission system includes a profiled gear, first rack and second rack, wherein the first rack is parallel with the second rack and each of them is movably connected to one of two slide tracks located within an interior portion of the body case, wherein the profiled gear is connected with the body case above the first and second racks such that the profiled gear meshes with the first and second racks, and wherein the first and second racks are adapted and configured to slide in the slide track below the profiled gear.

11. The device of claim 10, wherein each locking mechanism is the ratchet wheel self-locking mechanism that each includes at least one spark on one end of each first rotational joint, and on one end of the second rack that is adjacent to the second rotational joint, and wherein a plurality of ratchets surround the first and second rotational joints such that the ratchets mesh with the at least one spark.

12. The device of claim 10, wherein each locking mechanism is the resistance wheel self-locking mechanism that each includes a friction brick connected with an end of the second rack that is adjacent to the second rotational joint and an end of the first rack that is adjacent to the first rotational joint, wherein each friction brick has a U-shape slot that defines an opening pointing towards the two sides of the body case such that a curved frictional concave of the U-shape slot matches the first rotational joint and the second rotational joint, wherein there are matching threads on the curved frictional concave, first rotational joint and second rotational joint.

13. The device of claim 12, wherein the curved frictional concave, first rotational joint and second rotational joint include a material selected from the group consisting of rubber, polymer, and aluminum so as to increase surface resistance.

14. The device of claim 10, wherein the transmission system has a drive system located outside of the body case, the drive system being operably connected to the profiled gear and electrically connected to the microcontroller, and wherein the drive system is selected from the group consisting of a servo motor, a gear motor linear actuator, and a screw motor.

15. The device of claim 1, wherein the microcontroller includes a Bluetooth module.

16. The device of claim 1, wherein the device has at least 11 degrees of freedom of movement.

17. The device of claim 1, wherein the finger cap includes a plurality of connection pieces that are selected from the group consisting of nylon straps, metal rings, and plastic rings.

18. The device of claim 1, wherein the finger caps form movable connections with the profiled link rods by a plurality of connection bolts.

19. The device of claim 12, wherein the device has at least 16 degrees of freedom of movement.

20. The device of claim 19, wherein the device has more than 16 degrees of freedom.

* * * * *